United States Patent
Erbes et al.

(10) Patent No.: US 6,587,535 B1
(45) Date of Patent: *Jul. 1, 2003

(54) JET PUMP SLIP JOINT LABYRINTH SEAL METHOD

(75) Inventors: John Geddes Erbes, Mountain View, CA (US); Martin Rudy Torres, San Jose, CA (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/682,017

(22) Filed: Jul. 10, 2001

(51) Int. Cl.[7] .................................. G21C 19/00
(52) U.S. Cl. .................. 376/260; 376/372; 376/392
(58) Field of Search .......................... 376/260

(56) References Cited

U.S. PATENT DOCUMENTS

| | | | |
|---|---|---|---|
| 3,378,456 A | * 4/1968 | Roberts ................. 376/407 |
| 3,389,055 A | * 6/1968 | Hughes ................. 376/285 |
| 3,625,820 A | * 12/1971 | Gluntz et al. ........... 376/372 |
| 3,838,002 A | * 9/1974 | Gluntz et al. ........... 376/407 |
| 4,285,770 A | 8/1981 | Chi et al. |
| 4,707,952 A | * 11/1987 | Krasnoff ................. 51/410 |
| 5,056,718 A | * 10/1991 | Wakefield ............... 239/441 |
| 5,184,434 A | * 2/1993 | Hollinger et al. ........ 51/317 |
| 5,324,907 A | * 6/1994 | Wallace ................. 219/69.15 |
| 5,363,556 A | 11/1994 | Banholzer et al. |
| 5,512,007 A | * 4/1996 | De Lucia et al. ......... 451/75 |
| 5,802,126 A | 9/1998 | Matsumoto et al. |
| 5,897,793 A | 4/1999 | Chavez |
| 5,979,663 A | * 11/1999 | Herrmann et al. ....... 209/139.1 |
| 6,049,580 A | * 4/2000 | Bodin et al. ............ 376/316 |
| 6,108,391 A | * 8/2000 | Deaver et al. ........... 376/260 |
| 6,345,084 B1 | * 2/2002 | Jensen .................. 138/89 |

FOREIGN PATENT DOCUMENTS

JP          60-165600     * 8/1985

* cited by examiner

Primary Examiner—Michael J. Carone
Assistant Examiner—R Palabrica
(74) Attorney, Agent, or Firm—Armstrong Teasdale LLP (57) ABSTRACT

Methods for cutting a labyrinth seal in a nuclear reactor jet pump assembly are described. In one embodiment, the method includes removing an irradiated jet pump inlet mixer from the jet pump assembly, positioning the jet pump inlet mixer underwater, and cutting at least one circumferential groove in an inlet mixer outside surface.

37 Claims, 7 Drawing Sheets

JET PUMP SLIP JOINT LABYRINTH SEAL METHOD

BACKGROUND OF INVENTION

This invention relates generally to nuclear reactors and more particularly, to methods for installing jet pump slip joint labyrinth seals.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus, provide the required reactor core water flow. The upper portion of the jet pump, known as the inlet mixer, is laterally positioned and supported against two opposing rigid contacts within restrainer brackets. The restrainer brackets support the inlet mixer by attaching to the adjacent jet pump riser pipe. The lower portion of the jet pump, known as the diffuser, is coupled to the inlet mixer by a slip joint. The slip joint between the jet pump inlet mixer and the jet pump diffuser has about 0.015 inch diametral operating clearance which accommodates the relative axial thermal expansion movement between the upper and lower parts of the jet pump and permits leakage flow from the driving pressure inside the pump.

Excessive leakage flow can cause oscillating motion in the slip joint, which is a source of detrimental vibration excitation in the jet pump assembly. The slip joint leakage rate can increase due to single loop operation, increased core flow, or jet pump crud deposition. The resultant increased vibration levels and corresponding vibration loads on the piping and supports can cause jet pump component degradation from wear and fatigue.

High levels of flow induced vibration (FIV) are possible under some abnormal operational conditions having increased leakage rates. Reducing flow leakage through the slip joint results in reduced oscillating motion and FIV. A labyrinth seal or labyrinth grooves in jet pump assemblies, as described in U.S. Pat. No. 4,285,770, facilitate reducing flow leakage through the slip joint. Leakage is reduced by the increase in flow resistance resulting from the labyrinth groove geometry flow area expansion and contraction losses.

Jet pump assemblies and other components within nuclear reactor pressure vessels (RPV) become irradiated, and those nearest the reactor core become highly irradiated. Because these components are radioactive, they are kept underwater to provide radiation shielding to workers in the proximity of the reactor components. Cobalt-60, which emits two high-energy gamma rays upon radioactive decay, is generally the isotope with the greatest impact on non-core component radioactivity. Cobalt-60 is produced by a neutron activation reaction with the cobalt present in most austenitic stainless steels used in nuclear reactor component fabrication and in some component hardfacing or surface treatments. Providing labyrinth seals in jet pump assemblies of previously operated, irradiated jet pump assemblies would reduce flow leakage and FIV.

SUMMARY OF INVENTION

In one aspect, a method for cutting a labyrinth seal in a nuclear reactor jet pump assembly is described. The method includes removing an irradiated jet pump inlet mixer from the jet pump assembly, positioning the jet pump inlet mixer underwater, and cutting at least one circumferential groove in an irradiated inlet mixer outside surface.

In a further aspect, a method for cutting a labyrinth seal in a nuclear reactor jet pump assembly is described. The method includes removing an irradiated jet pump inlet mixer from the jet pump assembly, positioning at least a portion of a cutting system in a jet pump diffuser, and cutting at least one circumferential groove in a jet pump diffuser inner surface.

DETAILED DESCRIPTION

Figure 1:
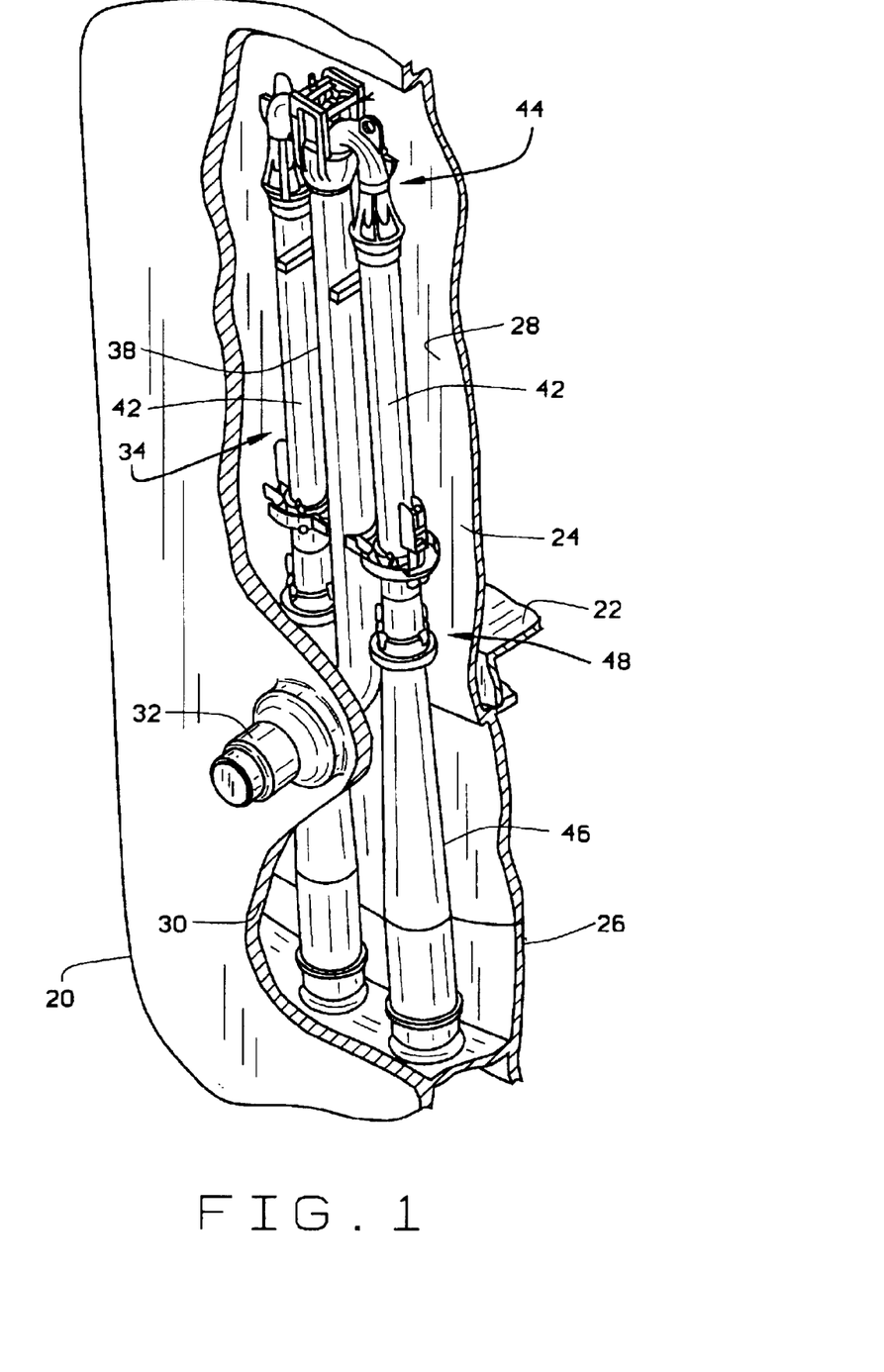
FIG. 1 is schematic, partial sectional view, with parts cut away, of a reactor pressure vessel of a boiling water nuclear reactor.

FIG. 1 is a schematic, partial sectional view, with parts cut-away, of a reactor pressure vessel (RPV) 20 for a boiling water reactor. RPV 20 has a generally cylindrical shape and is closed at one end by a bottom head (not shown) and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and sidewall 30 of RPV 20.

An inlet nozzle 32 extends through sidewall 30 of RPV 20 and is coupled to a jet pump assembly 34. Jet pump assembly 34 includes a riser pipe 38, a plurality of irradiated inlet mixers 42 connected to a plurality of riser pipes 38 by a plurality of transition assemblies 44, and a diffuser 46. Riser pipe 38 extends between and substantially parallel to shroud 24 and RPV sidewall 30. A slip joint 48 couples each irradiated inlet mixer 42 to a corresponding diffuser 46.

Figure 2:
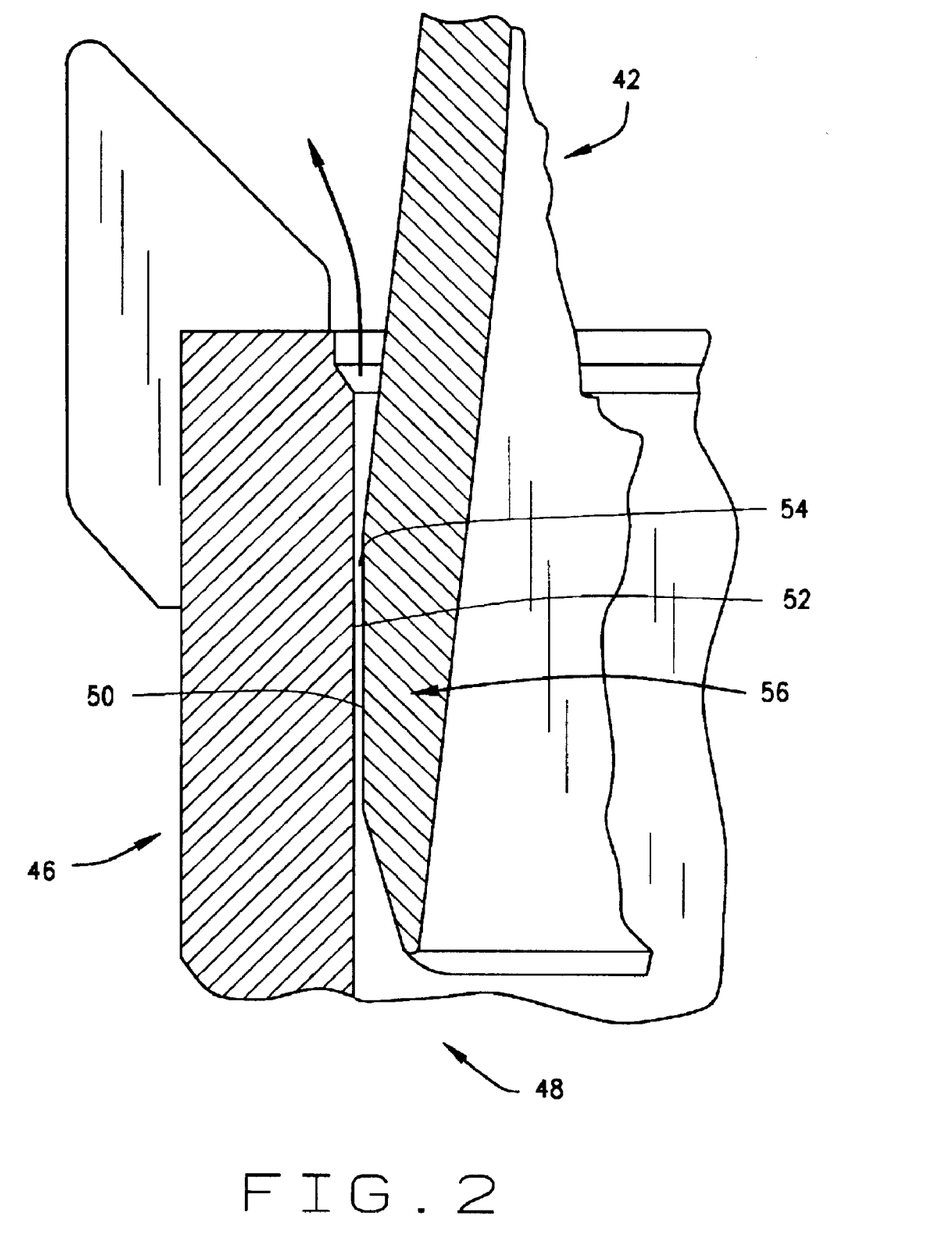
FIG. 2 is a schematic, partial side view, with parts cut away, of a jet pump slip joint.

FIG. 2 is a schematic, partial side view, with parts cut away, of slip joint 48. Inlet mixer 42 is generally cylindrical and includes an outer surface 50. Inlet mixer 42 is received in diffuser 46. Diffuser 46 includes an inner surface 52 positioned adjacent to inlet mixer outer surface 50. An operational clearance 54 exists at an interface 56 between inlet mixer outer surface 50 and diffuser inner surface 52. Clearance 54 allows leakage flow from slip joint 48. In at least one known slip joint 48, irradiated inlet mixer outer surface 50 is stainless steel with a cobalt alloy hardfacing extending over interface 56. Diffuser inner surface 52 is also stainless steel, but has only localized areas of cobalt alloy hardfacing extending into interface 56.

Figure 3:
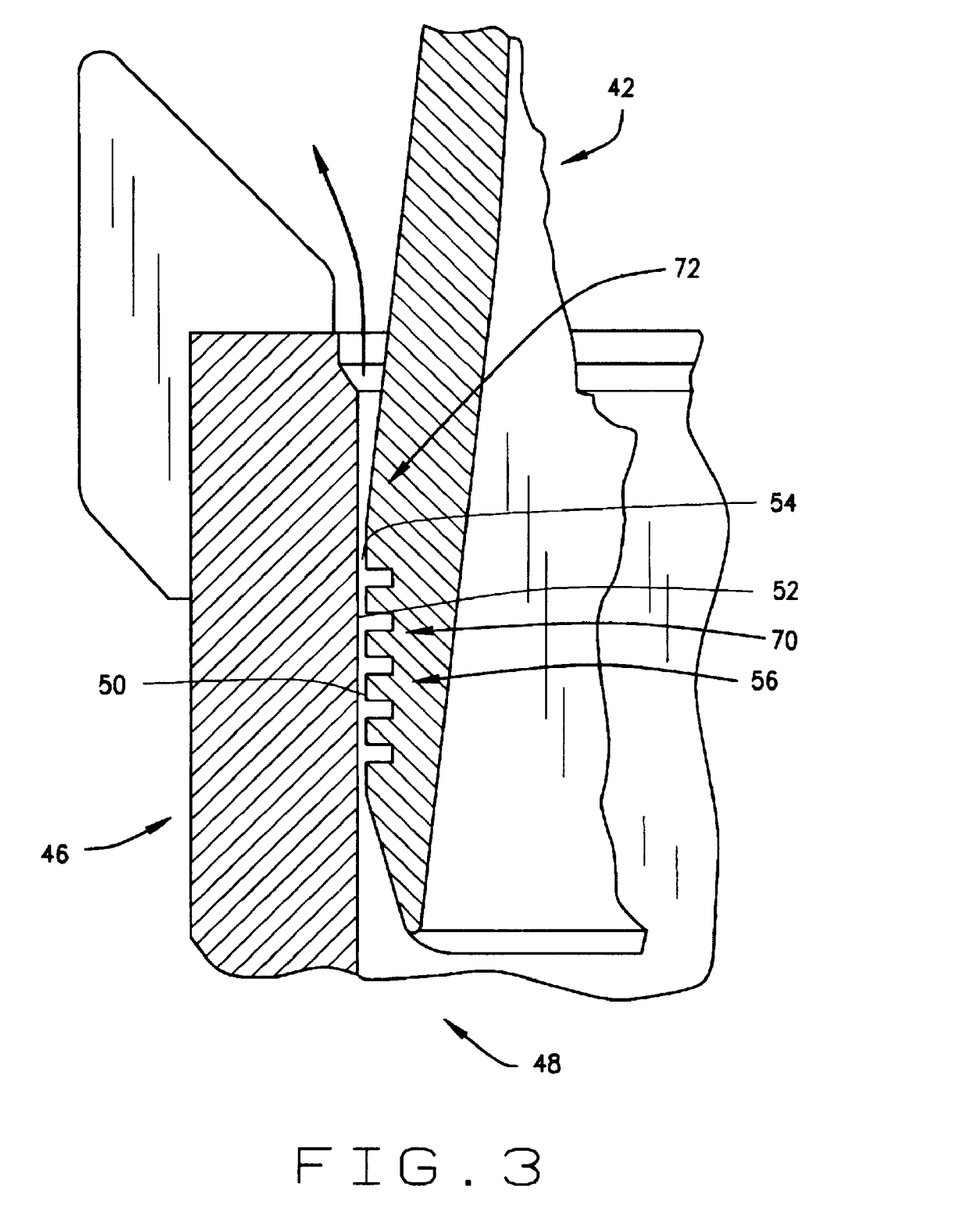
FIG. 3 is a schematic, partial side view, with parts cut away, of a jet pump slip joint with labyrinth grooves.

FIG. 3 is a schematic, partial side view, with parts cut away, of slip joint 48 with a plurality of labyrinth grooves 70 cut in inlet mixer outer surface 50 forming a labyrinth seal 72. In at least one known reactor, irradiated inlet mixer 42 is removable for maintenance or service during periodic maintenance shutdowns. Such maintenance is complicated by the radiation emitted by irradiated inlet mixer 42. Further, cutting debris, produced from the cutting of labyrinth grooves 70, is a radioactive contaminant. Reactor components removed for maintenance can be stored at depth in an adjacent equipment pool without interfering with other reactor maintenance work. The water covering the irradiated inlet mixer 42 provides radiation shielding for nearby personnel.

Figure 4:
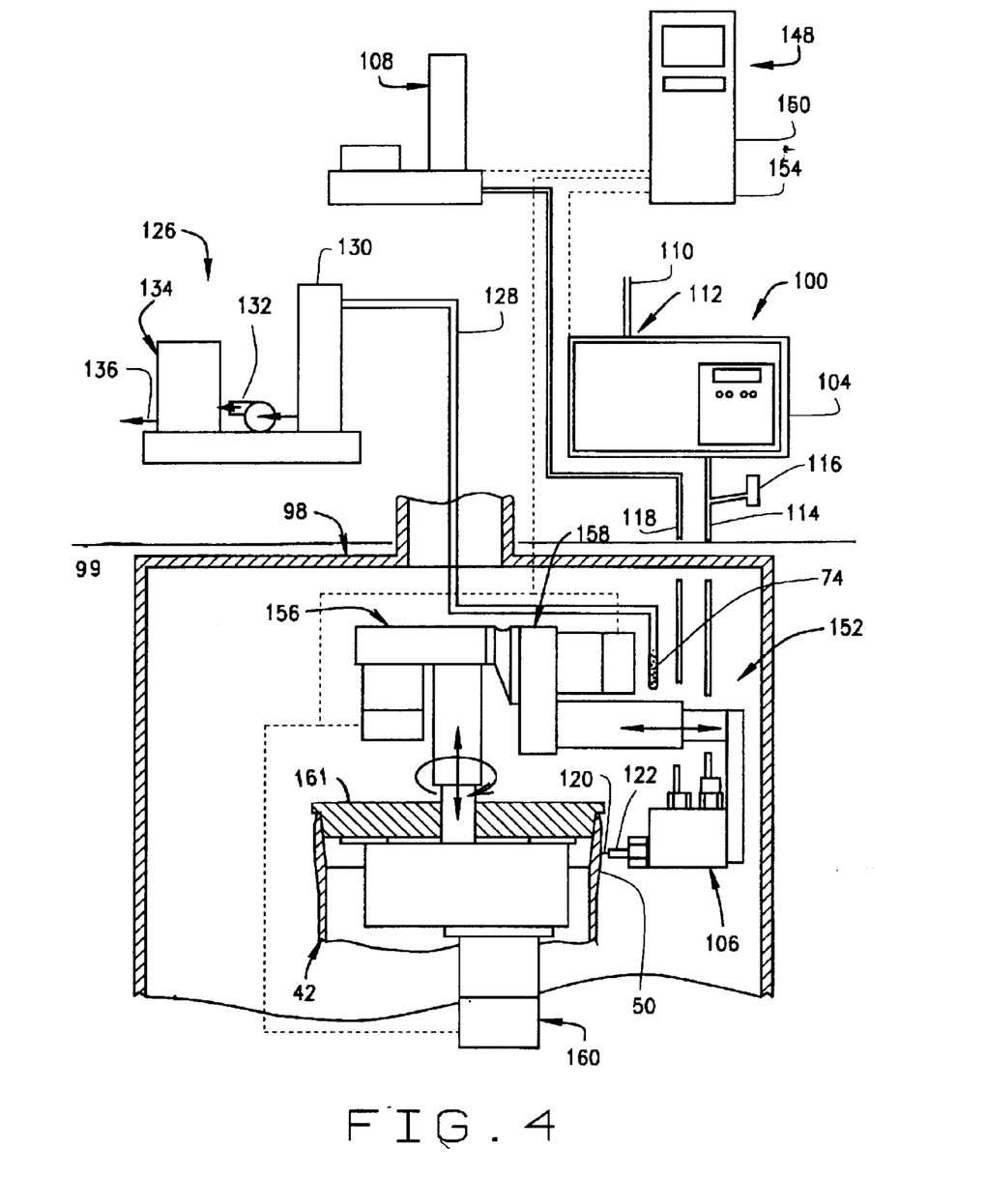
FIG. 4 is a schematic view of an ultra high-pressure system cutting an irradiated inlet mixer outer surface.

FIG. 4 is a schematic representation of an underwater cutting system 100 capable of cutting grooves 70 in irradiated inlet mixer 42, in a machining enclosure 98 located in an equipment pool 99. System 100 includes an ultra high-pressure (UHP) pump 104, an abrasive water jet cutting nozzle 106 and an abrasive material feed hopper 108.

Particularly, a water supply line 110 is connected to an inlet 112 of pump 104. An ultra high-pressure water line 114 supplies high-pressure water from pump 104 to cutting nozzle 106. To monitor the water pressure in high-pressure water line 114, a pressure gauge 116 is located in water line 114 between pump 104 and cutting nozzle 106. Typically, ultra high-pressure pump 104 is capable of supplying water at about 40,000 to 80,000 psi, however lower or higher water pressures may be used. Abrasive feed hopper 108 is coupled to cutting nozzle 106 by an abrasive feed line 118. Abrasive feed hopper 108 and abrasive feed line 118 are configured to supply abrasive particles to cutting nozzle 106

Abrasive water jet cutting nozzle 106 includes a nozzle orifice 122. High-pressure water enters cutting nozzle 106 via water line 114 and is expelled from orifice 122, forming an ultra high-pressure water cutting stream 120. Abrasive material flowing through abrasive feed line 118 is mixed together with stream 120. Impingement of ultra high-pressure water cutting stream 120 with the abrasive particles causes localized erosion at a high rate and cuts grooves 70 in irradiated inlet mixer 42.

In one embodiment, a debris collection system 126 filters water from machining enclosure 98 to collect cutting debris 74. Cutting debris 74 is radioactive and requires special handling. Debris collection system 126 includes a collection line 128, a settling tank 130, a collection pump 132, a filter canister 134, and an outlet line 136. Water containing cutting debris 74 is suctioned from machining enclosure 98 via collection line 128 to settling tank 130. In one embodiment, a cyclone separator (not shown) collects cutting debris 74 prior to collection pump 132. Water from settling tank 130 is pumped through filter canister 134 to remove additional debris 74. In an alternate embodiment, filter canister 134 collects cutting debris 74 prior to water from settling tank 130 passing through collection pump 132. Filtered water may be returned to machining enclosure 98. In another embodiment, filtered water is sent to a plant treatment system (not shown) for additional processing.

Equipment pool 99 includes machining enclosure 98 for containment of radioactively contaminated cutting debris 74, and works in conjunction with debris collection system 126 to allow disposal of radioactive cutting debris 74 without spreading contamination to other areas. In one embodiment, machining enclosure 98 includes a positioning fixture (not shown) to secure inlet mixer 42 relative to cutting system 100.

A centralized control system (CCS) 148 facilitates controlling and positioning cutting system 100 relative to irradiated inlet mixer 42. CCS 148 includes an operator console 150 and a cutting nozzle manipulator 152. In one embodiment, CCS 148 further includes a computer controller 154. Cutting nozzle 106 is coupled to manipulator 152. Manipulator 152 is operated from operator console 150 and positions cutting nozzle 106 to facilitate cutting grooves 70 in irradiated inlet mixer 42. In one embodiment, manipulator 152 mounts to irradiated inlet mixer 42 and includes a first servo-controlled position actuator 156, a second servo-controlled position actuator 158, and a rotary actuator 160. Manipulator 152 is accurately located relative to inlet mixer 42 by a mandrel 161. Mandrel 161 and inlet mixer 42 are securely coupled by pneumatic or hydraulic clamping fixtures (not shown) mounted in machining enclosure 98. First actuator 156 positions cutting nozzle 106 axially relative to irradiated inlet mixer 42, while second actuator 158 positions cutting nozzle 106 radially from irradiated inlet mixer 42. Rotary actuator 160 controls movement of cutting nozzle 106 circumferentially about irradiated inlet mixer 42. In another embodiment, irradiated inlet mixer 42 is positioned on a turntable (not shown) configured to move irradiated inlet mixer 42 relative to cutting nozzle 106.

CCS 148 facilitates operation of cutting system 100, including operation and control of ultra high-pressure pump 104 and abrasive feed rate. In one embodiment, operator console 150 also controls operation of debris collection system 126.

In operation, irradiated inlet mixer 42 is removed from the RPV 20, positioned underwater in machining enclosure 98, and labyrinth grooves 70 (shown in FIG. 3) are cut utilizing underwater cutting system 100. Specifically, ultra high-pressure water is supplied to cutting nozzle 106. An abrasive material from abrasive feed hopper 108 supplied via abrasive feed line 118 is added to the ultra high-pressure water at cutting nozzle 106. Cutting nozzle 106 is positioned adjacent irradiated inlet mixer outer surface 50 in a predetermined position corresponding to the required location for cutting grooves 70, using mandrel 161. In one embodiment, cutting nozzle 106 is positioned utilizing computer controller 154 to operate servo-controlled positioning actuators 156, 158, and 160. Ultra high-pressure water stream 120 is expelled from cutting nozzle 106 and directed toward irradiated inlet mixer outer surface 50. The impingement of ultra high-pressure water cutting stream 52 carrying the abrasive particles cuts grooves 70 in irradiated inlet mixer outer surface 50. Cutting nozzle 106 is moved circumferentially at a specified, controlled rate and distance relative to irradiated inlet mixer outside surface 50 by servo-controlled positioning actuators 156 and 160, operated by computer controller 154 while ultra high pressure water stream 120 is expelled from cutting nozzle 106. Each circumferential pass of ultra high-pressure water stream 120 produces a narrow groove 70 with the dimensions of groove 70 controlled by the operator through parameters set in CCS 148. CCS 148 parameters are established by qualification testing. Multiple circumferential passes of cutting nozzle 106, indexed by actuator 156, are used to remove the desired material and obtain the desired dimensions for each groove 70, and for successive adjacent grooves 70. Remote monitoring equipment (not shown) including video cameras can be used to monitor cutting progress. Cutting grooves 70 underwater inside machining enclosure 98 facilitates limiting personnel radiation exposure and the spread of radioactive cutting debris 74. Cutting debris 74 is removed from the cutting area by debris collection system 126.

Figure 5:
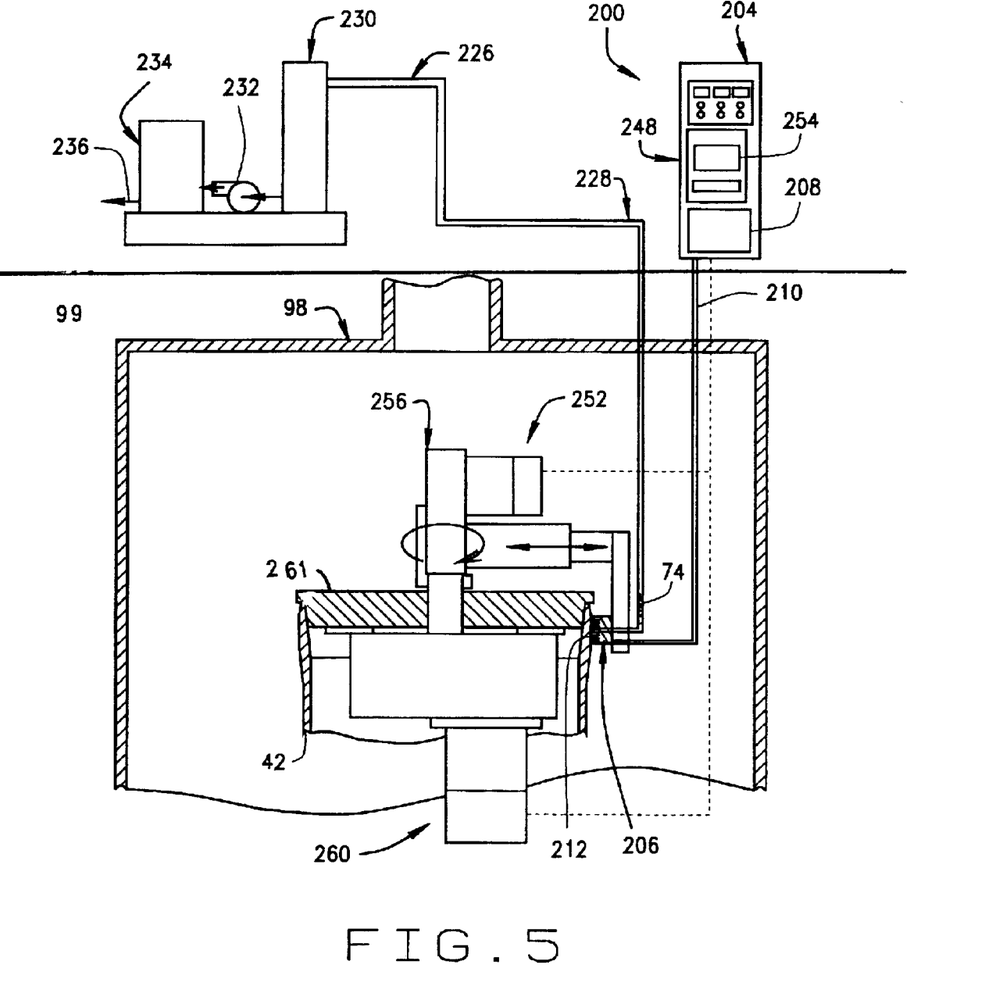
FIG. 5 is a schematic view of an electrical discharge machining system cutting an irradiated inlet mixer outer surface.

FIG. 5 is a schematic representation of an underwater electric discharge machining (EDM) system 200 capable of cutting grooves 70 in irradiated inlet mixer 42, in machining enclosure 98. Electric discharge machining (EDM) system 200 includes a control console 204, an EDM electrode head 206, an EDM power supply 208, and low inductance power cables 210.

Particularly, control console 204 regulates power from EDM power supply 208 through power cables 210 to EDM electrode head 206. In one embodiment, EDM electrode head 206 includes more than one EDM electrode 212 to facilitate cutting multiple grooves 70 in a single operation.

In one embodiment, a debris collection system 226 filters water from machining enclosure 98 to collect and retain cutting debris 74. Cutting debris 74 is radioactive and requires special handling. Debris collection system 226 includes a collection line 228, a settling tank 230, a collection pump 232, a filter canister 234, and an outlet line 236. Water containing the cutting debris 74 is suctioned from machining enclosure 98 via collection line 228 to settling tank 230. In one embodiment, a cyclone separator (not shown) collects cutting debris 74 prior to collection pump 232. Water from settling tank 230 is pumped through filter canister 234 to remove additional debris 74. Filter canister 234 collects cutting debris 74 prior to water from settling tank 230 passing through collection pump 232. In one embodiment, filtered water may be returned to machining enclosure 98. In another embodiment, filtered water is sent to treatment system (not shown) for additional processing.

A centralized control system (CCS) 248 facilitates control of EDM system 200 and irradiated inlet mixer 42. CCS 248 includes control console 204 and an EDM electrode head manipulator 252. In one embodiment, CCS 248 further includes a computer controller 254. EDM electrode head 206 is coupled to manipulator 252. Manipulator 252 is operated from computer controller 254 and positions EDM electrode head 206 to facilitate cutting grooves 70 in irradiated inlet mixer 42. In one embodiment, manipulator 252 mounts to irradiated inlet mixer 42 and includes a first servo-controlled position actuator 256 and a rotary actuator 260. Manipulator 252 is accurately located relative to inlet mixer 42 by a mandrel 261. Mandrel 261 and inlet mixer 42 are securely coupled by pneumatic or hydraulic clamping fixtures (not shown) mounted in machining enclosure 98. First actuator 256 positions EDM electrode head 206 radially relative to irradiated inlet mixer 42. Electrode 212 may be configured to produce the desired grooves 70 in a single circumferential pass. Rotary actuator 260 controls movement of EDM electrode head 206 circumferentially about irradiated inlet mixer 42. In another embodiment, one or more servo-controlled position actuators 256 are used to radially position three or more EDM electrode heads 206 relative to irradiated inlet mixer 42. Labyrinth grooves 70 may thus be machined in one pass without circumferential actuation. In another embodiment, irradiated inlet mixer 42 is positioned on a turntable (not shown) configured to move irradiated inlet mixer 42 relative to EDM electrode head 206. In one embodiment, computer controller 254 also controls operation of debris collection system 226.

In operation, irradiated inlet mixer 42 is removed from the RPV 20, positioned underwater in machining enclosure 98, and labyrinth grooves 70 (shown in FIG. 3) are cut utilizing EDM system 200. Specifically, EDM electrode head 206 is positioned adjacent irradiated inlet mixer outer surface 50 in a predetermined position corresponding to the required location for cutting grooves 70, using mandrel 261. In one embodiment, EDM electrode head 206 is positioned by servo-controlled positioning actuator 256 operated by computer controller 254. EDM electrode 212 is energized by electrical power from power supply 208 via power cables 210. The electrical power to EDM electrode 212 forms a high frequency series of electrical arcs to irradiated inlet mixer surface 50, eroding grooves 70 in irradiated inlet mixer outer surface 50. EDM electrode head 206 is moved circumferentially at a specified controlled rate and distance relative to the irradiated inlet mixer outside surface 50 utilizing computer controller 254 to operate servo-controlled positioning actuators 256 and 260 while electrode 212 is energized. Each circumferential pass of EDM electrode 212 produces grooves 70, with the dimensions of groove 70 controlled by the operator through parameters set in CCS 248. CCS 248 parameters are established by qualification testing. Multiple circumferential passes of EDM electrode 212, indexed by actuator 256, are used to remove the desired material and obtain the desired dimensions for each groove 70, and for successive adjacent grooves 70. Remote monitoring equipment (not shown) including video cameras can be used to monitor cutting progress. Cutting grooves 70 underwater inside machining enclosure 98 facilitates limiting personnel radiation exposure and the spread of radioactive cutting debris 74. Cutting debris 74 is removed from the cutting area by debris collection system 226.

Figure 6:
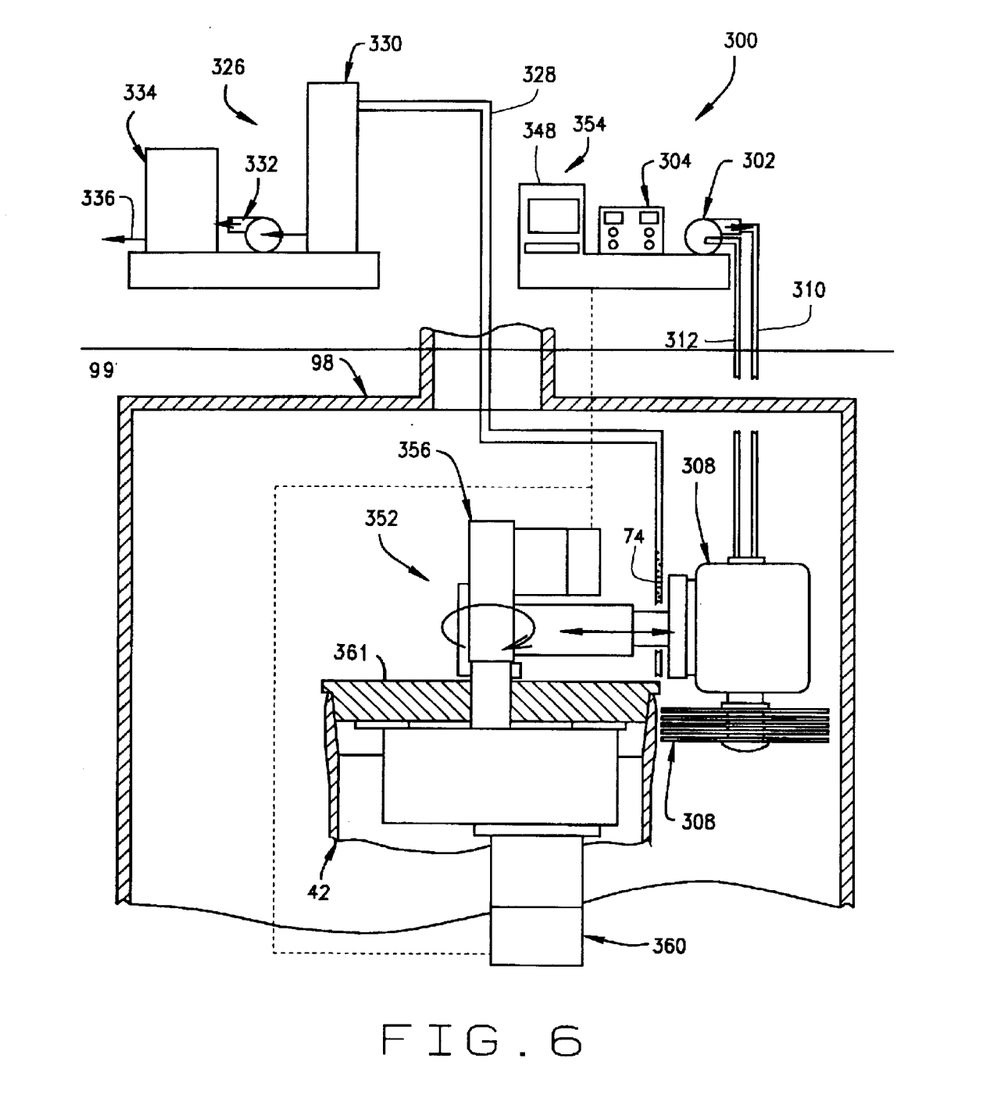
FIG. 6 is a schematic view of an abrasive disc system cutting an irradiated inlet mixer outer surface.

FIG. 6 is a schematic representation of an underwater abrasive disc system 300 capable of cutting grooves 70 in irradiated inlet mixer 42, machining enclosure 98. Abrasive disc system 300 includes a hydraulic pump 302, a control console 304, at least one abrasive disc 306, a hydraulic motor 308, a hydraulic fluid supply line 310, and a hydraulic fluid return line 312.

Particularly, control console 304 regulates hydraulic power from hydraulic pump 302 through hydraulic fluid supply and return lines 310 and 312 to hydraulic motor 308 to rotate abrasive discs 306. Abrasive discs 306 cut grooves 70 in irradiated inlet mixer outer surface 50. Multiple abrasive discs 306 facilitate cutting multiple grooves 70 in a single operation.

In one embodiment, a debris collection system 326 filters water from machining enclosure 98 to collect and retain cutting debris 74. Cutting debris 74 is radioactive and requires special handling. Debris collection system 326 includes a collection line 328, a settling tank 330, a collection pump 332, a filter canister 334, and an outlet line 336. Water containing the cutting debris 74 is suctioned from machining enclosure 98 via collection line 328 to settling tank 330. In one embodiment, a cyclone separator (not shown) collects cutting debris 74 prior to collection pump 332. Water from settling tank 330 is pumped through filter canister 334 to remove additional debris 74. Filter canister 334 collects cutting debris 74 prior to water from settling tank 330 passing through collection pump 332. In one embodiment, filtered water can be returned to machining enclosure 98. In another embodiment, filtered water is sent to a treatment system (not shown) for additional processing.

A centralized control system (CCS) 348 facilitates control of abrasive disc system 300 and irradiated inlet mixer 42. CCS 348 includes control console 304 and an abrasive disc manipulator 352. In one embodiment, CCS 348 further includes a computer controller 354. Hydraulic motor 308 is coupled to manipulator 352. Manipulator 352 is operated from computer controller 354 and positions hydraulic motor 308 to facilitate abrasive disc 306 cutting grooves 70 in irradiated inlet mixer 42. In one embodiment, manipulator 352 mounts to irradiated inlet mixer 42 and includes a first servo-controlled position actuator 356 and a rotary actuator 360. Manipulator 352 is accurately located relative to inlet mixer 42 by a mandrel 361. Mandrel 361 and inlet mixer 42 are securely coupled by pneumatic or hydraulic clamping fixtures (not shown) mounted in machining enclosure 98. First actuator 356 positions hydraulic motor 308 to radially position abrasive disc 306 relative to irradiated inlet mixer 42. Rotary actuator 360 controls movement of hydraulic motor 308, and thus abrasive disc 306 circumferentially about irradiated inlet mixer 42. In another embodiment, irradiated inlet mixer 42 is positioned on a turntable (not shown) configured to move irradiated inlet mixer 42 relative to abrasive disc 306. Computer controller 354 may also control operation of debris collection system 326.

In operation, irradiated inlet mixer 42 is removed from the RPV 20, positioned underwater in machining enclosure 98, and labyrinth grooves 70 (shown in FIG. 3) are cut utilizing abrasive disc system 300. Specifically, abrasive disc 306 is positioned adjacent irradiated inlet mixer outer surface 50 in a predetermined position corresponding to the required location for grooves 70. In one embodiment, abrasive disc 306 is positioned by servo-controlled positioning actuator 356 operated by computer controller 354. Abrasive disc 306 is rotated by hydraulic motor 308, controlled by CCS 348 to cut grooves 70 in irradiated inlet mixer outer surface 50. Abrasive disc 306 is moved circumferentially relative to the irradiated inlet mixer outside surface 50 utilizing computer controller 354 to operate rotary servo-controlled positioning actuator 360 while abrasive disc 306 is rotating. Each circumferential pass of abrasive disc 306 produces grooves 70 with the dimensions of groove 70 controlled by the operator through parameters set in CCS 348. CCS 348 parameters are established by qualification testing. Multiple circumferential passes of abrasive disc 306, indexed by actuator 356, are used to remove the desired material and obtain the desired dimensions for each groove 70, and for adjacent grooves 70. Remote monitoring equipment (not shown) including video cameras can be used to monitor cutting progress. Cutting grooves 70 underwater inside machining enclosure 98 facilitates limiting personnel radiation exposure and the spread of radioactive cutting debris 74. Cutting debris 74 is removed from the cutting area by debris collection system 326.

Upon completion of cutting labyrinth grooves 70 in irradiated inlet mixer outer surface 50, irradiated inlet mixer 42 is inspected, cleaned and serviced as necessary. Irradiated inlet mixer 42 is reinstalled in RPV 20 in accordance with accepted maintenance procedures, forming a labyrinth seal 72 with diffuser 46.

As discussed above, in at least one known jet pump slip joint 48, irradiated inlet mixer outer surface 50 is stainless steel with a cobalt alloy hardfacing. Cutting of irradiated inlet mixer outer surface 50 generates significant radioactive debris 74 because of the radioactive cobalt in irradiated inlet mixer outer surface 50. Diffuser inner surface 52 is stainless steel, but does not include cobalt alloy hardfacing extending into interface 56 (shown in FIG. 3).

Figure 7:
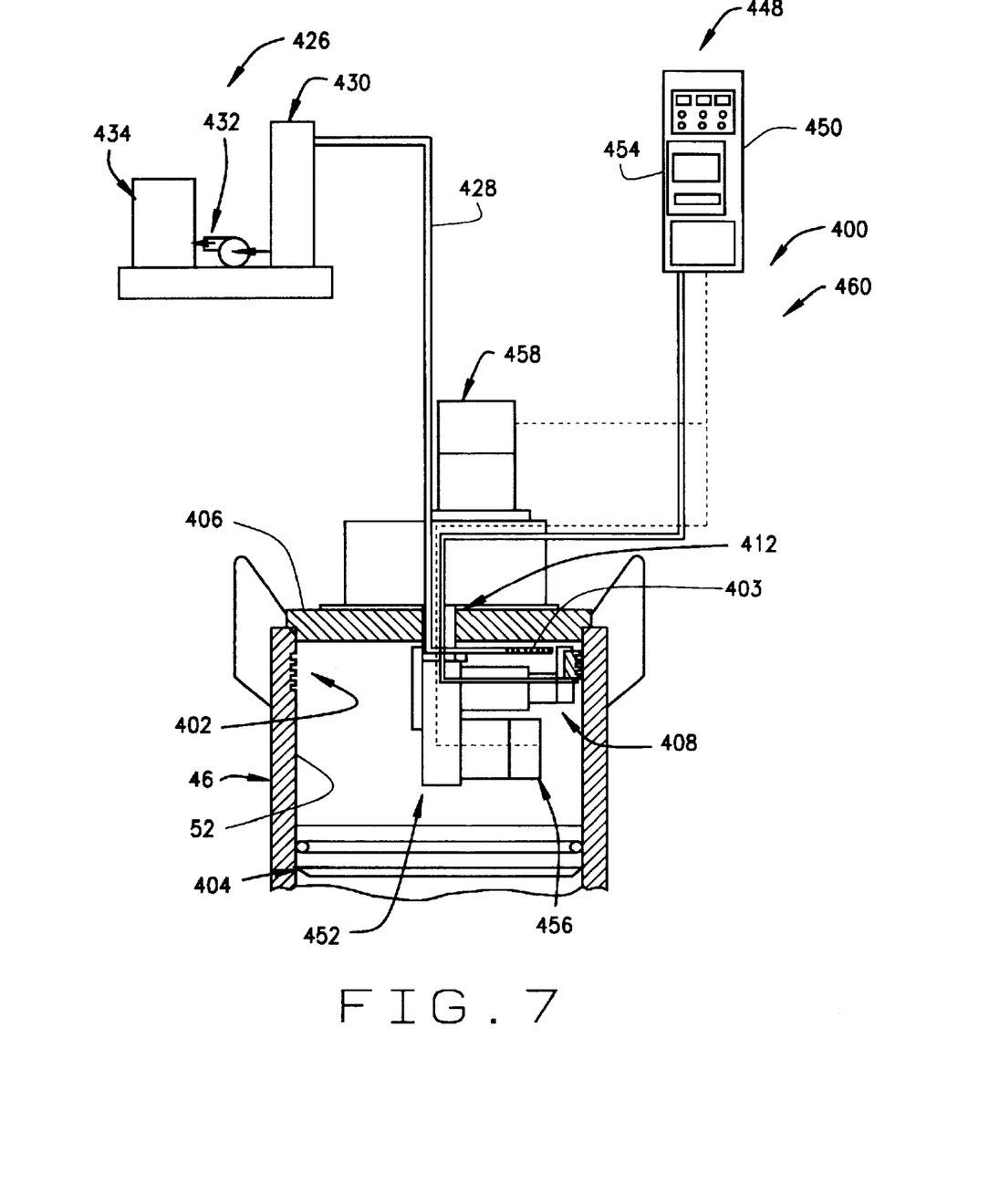
FIG. 7 is a schematic view of a cutting system capable of cutting labyrinth grooves in irradiated diffuser inner surface mounted in RPV.

FIG. 7 is a schematic representation of an underwater cutting system 400 capable of cutting labyrinth grooves 402 in irradiated diffuser inner surface 52 while mounted in RPV 20 (shown in FIG. 1). Because irradiated diffuser inner surface 52 contains less cobalt, cutting debris 403 is less radioactive. However, diffuser inner surface 52 is not removable from RPV 20.

To minimize contamination of other reactor components by cutting debris 403 a bottom seal plug 404 and a top seal plug 406 restrict flow from diffuser 46. Cutting system 400 includes a cutting head 408 inside diffuser 46, between bottom seal plug 404 and top seal plug 406. Cutting head 408 facilitates cutting grooves 402 in irradiated diffuser inner surface 52. At least one of seal plug 404 and seal plug 406 includes at least one restrictive opening 412 to facilitate operation of cutting head 408. In one embodiment, restrictive openings 412 pass power cables, control cables, and debris collection lines.

In one embodiment, a debris collection system 426 filters water from diffuser 46 to collect and retain cutting debris 403. Cutting debris 403 is radioactive and requires special handling. Debris collection system 426 includes a collection line 428, a settling tank 430, a collection pump 432, a filter canister 434, and an outlet line 436. Water containing the cutting debris 403 is suctioned from diffuser 46 via collection line 428 to settling tank 430. In one embodiment, a cyclone separator (not shown) collects cutting debris 403 prior to collection pump 432. Water from settling tank 430 is pumped through filter canister 434 to remove additional debris 403. In one embodiment, filter canister 434 collects cutting debris 403 prior to water from settling tank 430 passing through collection pump 432. In one embodiment, filtered water can be returned to diffuser 46. In another embodiment, filtered water is sent to a treatment system (not shown) for additional processing.

A centralized control system (CCS) 448 facilitates control of cutting system 400. CCS 448 includes a control console 450 and a manipulator 452. In one embodiment, CCS 448 further includes a computer controller 454. Cutting head 408 is coupled to manipulator 452. Manipulator 452 is operated by computer controller 454 and cutting head 408 to facilitate cutting grooves 402 in irradiated diffuser inner surface 52. In one embodiment, manipulator 452 includes a first servo-controlled position actuator 456 and a rotary actuator 458. First actuator 456 positions cutting head 408 radially relative to irradiated diffuser inner surface 52. Rotary actuator 458 controls movement of cutting head 408 circumferentially adjacent irradiated diffuser inner surface 52. Computer controller 454 may also control operation of debris collection system 426.

In one embodiment, cutting system 400 includes an EDM system 460. EDM system 460 includes an EDM power supply 462, low inductance power cables 464, an EDM electrode head 466, a control console 468, and control lines 480. Cutting head 408 includes EDM electrode head 466 inside diffuser 46, between bottom seal plug 404 and top seal plug 406. Power cables 464, control lines 480, and collection line 428 extend through top seal plug 406 through restrictive opening 412.

In another embodiment, system 400 includes an ultra high pressure (UHP) pump, an abrasive water jet cutting nozzle, and an abrasive material feed hopper. Cutting head 408 includes the abrasive water jet cutting nozzle inside diffuser 46, between bottom seal plug 404 and top seal plug 406.

In another embodiment, cutting system 400 includes an abrasive disc system. Cutting head 408 includes abrasive discs inside diffuser 46, between bottom seal plug 404 and top seal plug 406.

In operation, irradiated inlet mixer 42 is removed from the RPV 20, positioned underwater in equipment pool 99. As is known in the art, special precautions for handling radioactive material must be followed. Additional special controls are required while working in RPV 20. Cutting system 400 is installed in diffuser 46 adjacent diffuser inner surface 52. Specifically, top seal plug 406 and cutting system 400 are positioned in diffuser 46. Cutting head 408 is positioned adjacent irradiated diffuser inner surface 52 in a predetermined position corresponding to the required location for grooves 402. In one embodiment, cutting head 408 is positioned by servo-controlled positioning actuator 456 operated by computer controller 454. Controlled by CCS 448, cutting system 400 cuts grooves 402 in irradiated diffuser inner surface 52. Cutting head 408 is moved circumferentially relative to the irradiated diffuser inner surface 52 utilizing computer controller 454 to operate rotary servo-controlled positioning actuator 458 while cutting head 408 is energized. Each circumferential pass of cutting head 408 produces a groove 402 with the dimensions of groove 402 controlled by the operator through parameters set in CCS 448. CCS 448 parameters are established by qualification testing. Multiple circumferential passes of cutting head 408, indexed by actuator 456, are used to remove the desired material and obtain the desired dimensions for each groove 402, and for successive adjacent grooves 402. Cutting grooves 402 underwater facilitates limiting the spread of radioactive cutting debris 403. Remote monitoring equipment (not shown) including video cameras can be used to monitor cutting progress. Cutting debris 403 is removed from the cutting area by debris collection system 426.

Upon completion of cutting labyrinth grooves 402 in irradiated diffuser inner surface 52, cutting system 400 and debris collection system 426 are removed. Irradiated diffuser 46 is inspected, cleaned and serviced as necessary. Irradiated inlet mixer 42 is reinstalled in RPV 20 in accordance with accepted maintenance procedures, forming a labyrinth seal 72 with diffuser 46.

While the invention has been described in terms of various specific embodiments, those skilled in the art will recognize that the invention can be practiced with modification within the spirit and scope of the claims.

What is claimed is:

1. A method for cutting a labyrinth seal in a nuclear reactor jet pump assembly, the jet pump assembly comprising an inlet mixer and a diffuser joined by a slip joint, said method comprising:
    removing the jet pump inlet mixer from the jet pump assembly;
    positioning the jet pump inlet mixer underwater;
    cutting at least one new circumferential groove into an outside surface of the inlet mixer, at a location corresponding to the slip joint, with at least one of an abrasive water jet cutting nozzle, an electrical discharge machining system, and an abrasive disk system; and
    collecting cutting debris by suctioning water containing the cutting debris into a debris collection system.

2. A method in accordance with claim 1 wherein cutting at least one circumferential groove comprises utilizing an abrasive water jet cutting nozzle positioned underwater adjacent the irradiated inlet mixer outside surface.

3. A method in accordance with claim 2 wherein utilizing an abrasive water jet cutting nozzle comprises:
    supplying ultra high-pressure water to the cutting nozzle;
    adding abrasive material to the ultra high-pressure water at the cutting nozzle;
    positioning the cutting nozzle adjacent the irradiated inlet mixer outside surface;
    expelling a stream of ultra high pressure water including abrasive material from the cutting nozzle; and
    directing the ultra high-pressure water stream with abrasive material toward the irradiated inlet mixer outside surface.

4. A method in accordance with claim 3 wherein utilizing an abrasive water jet cutting nozzle further comprises moving the cutting nozzle circumferentially relative to the irradiated inlet mixer outside surface while the stream of ultra high pressure water including abrasive material is expelled from the cutting nozzle.

5. A method in accordance with claim 4 wherein moving the cutting nozzle comprises utilizing a computer controller to operate a servo-controlled positioning actuator.

6. A method in accordance with claim 1 wherein cutting at least one circumferential groove comprises utilizing an electrical discharge machining (EDM) system, a portion of the EDM system positioned underwater adjacent the irradiated inlet mixer outside surface.

7. A method in accordance with claim 6 wherein utilizing an EDM system comprises:
    positioning a cutting electrode adjacent the irradiated inlet mixer outside surface;
    supplying electrical power to the cutting electrode; and
    directing an electrical discharge toward the irradiated inlet mixer outside surface.

8. A method in accordance with claim 7 wherein utilizing an EDM system further comprises moving the cutting electrode circumferentially relative to the irradiated inlet mixer outside surface while directing the electrical discharge toward the irradiated inlet mixer outside surface.

9. A method in accordance with claim 8 wherein moving the cutting electrode further comprises utilizing a computer controller to operate a servo-controlled positioning actuator.

10. A method in accordance with claim 1 wherein cutting at least one circumferential groove comprises utilizing an abrasive disc system, a portion of the abrasive disc system positioned underwater adjacent the irradiated inlet mixer outside surface.

11. A method in accordance with claim 10 wherein utilizing an abrasive disc system comprises:
    positioning an abrasive disc adjacent the irradiated inlet mixer outside surface; and
    rotating the abrasive disc.

12. A method in accordance with claim 11 wherein utilizing an abrasive disc system further comprises moving the rotating abrasive disc circumferentially relative to the irradiated inlet mixer outside surface.

13. A method in accordance with claim 12 wherein moving the rotating abrasive disc further comprises utilizing a computer controller to operate a servo-controlled positioning actuator.

14. A method for cutting a labyrinth seal in a nuclear reactor jet pump assembly, said method comprising:
    removing an irradiated jet pump inlet mixer from the jet pump assembly;
    positioning at least a portion of a cutting system in a jet pump diffuser; and
    cutting at least one circumferential groove in a jet pump diffuser inner surface.

15. A method in accordance with claim 14 further comprises collecting cutting debris.

16. A method in accordance with claim 15 wherein collecting cutting debris comprises:
    isolating the jet pump diffuser inner surface; and
    suctioning water containing the cutting debris into a collecting system.

17. A method in accordance with claim 14 wherein cutting at least one circumferential groove comprises utilizing an abrasive water jet cutting nozzle positioned underwater adjacent the jet pump diffuser inner surface.

18. A method in accordance with claim 17 wherein utilizing an abrasive water jet cutting nozzle comprises:

supplying ultra high-pressure water to the cutting nozzle;

adding abrasive material to the ultra high-pressure water at the cutting nozzle;

positioning the cutting nozzle adjacent the jet pump diffuser inner surface;

expelling a stream of ultra high pressure water including abrasive material from the cutting nozzle; and directing the ultra high-pressure water stream with abrasive material toward the jet pump diffuser inner surface.

19. A method in accordance with claim 18 wherein utilizing an abrasive water jet cutting nozzle further comprises moving the cutting nozzle circumferential relative to the jet pump diffuser inner surface while the stream of ultra high pressure water including abrasive material is expelled from the cutting nozzle.

20. A method in accordance with claim 19 wherein moving the cutting nozzle relative to the jet pump diffuser inner surface comprises utilizing a computer controller to operate a servo-controlled positioning actuator.

21. A method in accordance with claim 14 wherein cutting at least one circumferential groove comprises utilizing an electrical discharge machining (EDM) system, a portion of the EDM system positioned underwater adjacent the jet pump diffuser inner surface.

22. A method in accordance with claim 21 wherein utilizing an EDM system comprises:

positioning a cutting electrode adjacent the jet pump diffuser inner surface;

supplying electrical power to the cutting electrode; and directing an electrical discharge toward the jet pump diffuser inner surface.

23. A method in accordance with claim 22 wherein utilizing an EDM system further comprises moving the cutting electrode relative to the jet pump diffuser inner surface while directing the electrical discharge toward the jet pump diffuser inner surface.

24. A method in accordance with claim 23 wherein moving the cutting electrode further comprises utilizing a computer controller to operate a servo-controlled positioning actuator.

25. A method in accordance with claim 14 wherein cutting at least one circumferential groove comprises utilizing an abrasive disc system, a portion of the abrasive disc system positioned underwater adjacent the jet pump diffuser inner surface.

26. A method in accordance with claim 25 wherein utilizing an abrasive disc system comprises:

positioning an abrasive disc adjacent the jet pump diffuser inner surface; and rotating the abrasive disc.

27. A method in accordance with claim 26 wherein utilizing an abrasive disc system further comprises moving the rotating abrasive disc relative to the jet pump diffuser inner surface.

28. A method in accordance with claim 27 wherein moving the rotating abrasive disc further comprises utilizing a computer controller to operate a servo-controlled positioning actuator.

29. A method for cutting a labyrinth seal in a nuclear reactor jet pump assembly, the jet pump assembly comprising an inlet mixer and a diffuser joined by a slip joint, said method comprising:

removing the jet pump inlet mixer from the jet pump assembly;

cutting at least one new circumferential groove into at least one of an outer surface of the inlet mixer and an inner surface of the diffuser, at a location corresponding to the slip joint, with at least one of an abrasive water jet cutting nozzle, an electrical discharge machining system, and an abrasive disk system; and collecting cutting debris by suctioning water containing the cutting debris into a debris collection system.

30. A method in accordance with claim 29 wherein cutting at least one circumferential groove comprises:

positioning an abrasive water jet cutting nozzle adjacent at least one of the outer surface of the inlet mixer and the inner surface of the diffuser;

supplying ultra high-pressure water to the cutting nozzle;

adding abrasive material to the ultra high-pressure water at the cutting nozzle;

expelling a stream of ultra high pressure water including abrasive material from the cutting nozzle; and directing the ultra high-pressure water stream with abrasive material toward at least one of the diffuser inner surface and the inlet mixer outer surface.

31. A method in accordance with claim 30 wherein cutting at least one circumferential groove further comprises moving the cutting nozzle circumferential relative to at least one of the diffuser inner surface and the inlet mixer outer surface while the stream of ultra high pressure water including abrasive material is expelled from the cutting nozzle.

32. A method in accordance with claim 31 wherein moving the cutting nozzle relative to the jet pump diffuser inner surface comprises utilizing a computer controller to operate a servo-controlled positioning actuator.

33. A method in accordance with claim 29 wherein cutting at least one circumferential groove comprises:

positioning an EDM cutting electrode adjacent at least one of the diffuser inner surface and the inlet mixer outer surface;

supplying electrical power to the cutting electrode; and directing an electrical discharge toward at least one of the pump diffuser inner surface and the inlet mixer outer surface.

34. A method in accordance with claim 33 wherein cutting at least one circumferential groove further comprises moving the EDM cutting electrode relative to at least one of the diffuser inner surface and the inlet mixer outer surface while directing the electrical discharge toward at least one of the diffuser inner surface and the inlet mixer outer surface.

35. A method in accordance with claim 34 wherein moving the cutting electrode further comprises utilizing a computer controller to operate a servo-controlled positioning actuator.

36. A method in accordance with claim 29 wherein cutting at least one circumferential groove comprises:

positioning an abrasive disc adjacent the jet pump diffuser inner surface;

rotating the abrasive disc; and moving the rotating abrasive disc relative to at least on of the diffuser inner surface and the inlet mixer outer surface.

37. A method in accordance with claim 36 wherein moving the rotating abrasive disc further comprises utilizing a computer controller to operate a servo-controlled positioning actuator.

* * * * *

UNITED STATES PATENT AND TRADEMARK OFFICE
CERTIFICATE OF CORRECTION

PATENT NO. : 6,587,535 B1
DATED : July 1, 2003
INVENTOR(S) : Erbes et al.

It is certified that error appears in the above-identified patent and that said Letters Patent is hereby corrected as shown below:

Column 12,
Line 59, delete "at least on of" and insert therefor -- at least one of --.

Signed and Sealed this

Second Day of September, 2003

JAMES E. ROGAN
*Director of the United States Patent and Trademark Office*